Patented Sept. 9, 1924.

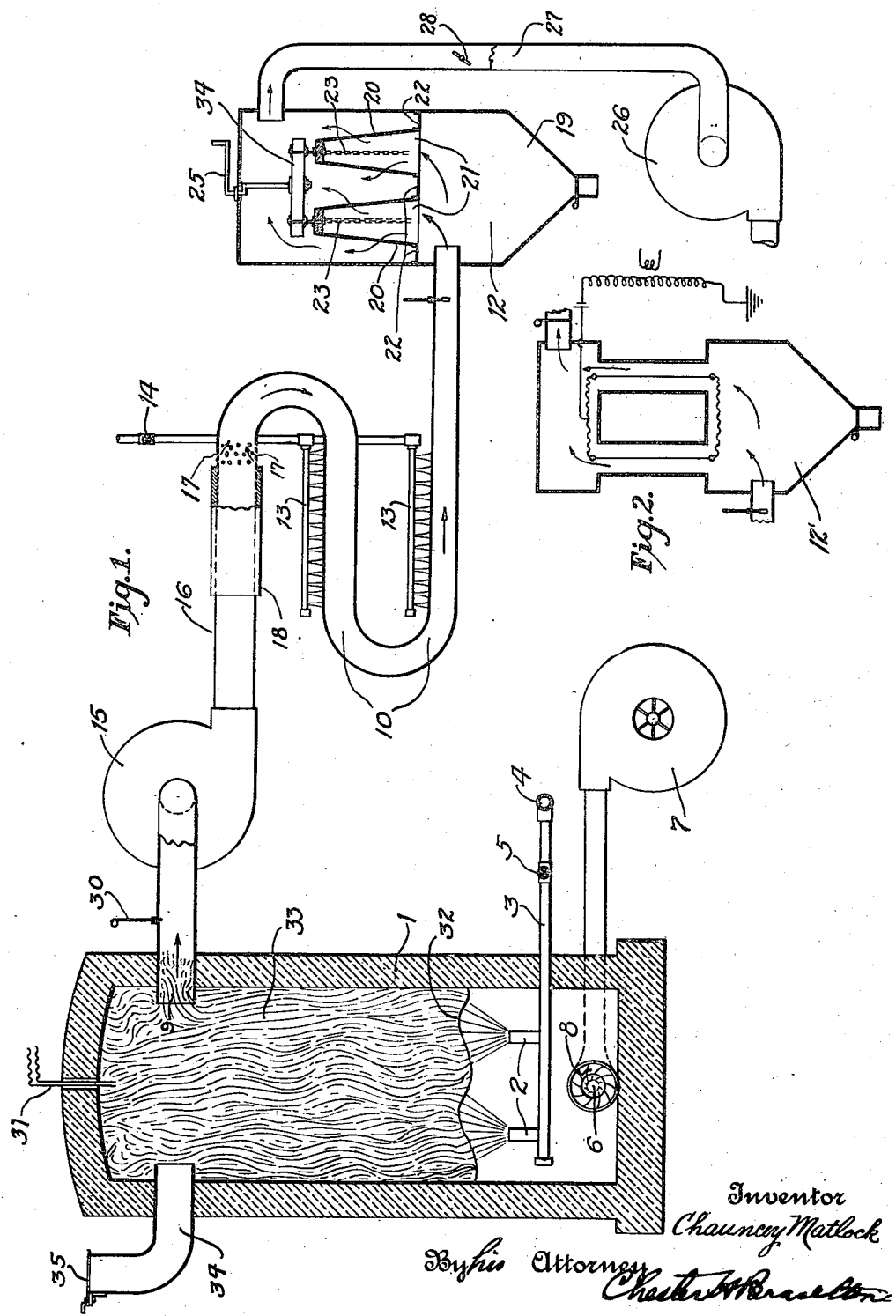

1,508,367

UNITED STATES PATENT OFFICE.

CHAUNCEY MATLOCK, OF BROOKLYN, NEW YORK, ASSIGNOR TO MONROE-LOUISIANA CARBON COMPANY, OF MONROE, LOUISIANA, A CORPORATION OF DELAWARE.

METHOD AND APPARATUS FOR PRODUCING CARBON BLACK.

Application filed January 5, 1921. Serial No. 435,074.

*To all whom it may concern:*

Be it known that I, CHAUNCEY MATLOCK, residing at 207 Park Place, Brooklyn, county of Kings, State of New York, have invented certain new and useful Improvements in Methods and Apparatus for Producing Carbon Black, of which I declare the following to be a full, clear, and exact description.

This invention relates to the disassociation of the constituents of hydrocarbons and particularly to the disassociation of a hydrocarbon gas and the collection and recovery of the elemental carbon therefrom.

The object of my invention generally is to obtain an improved quality of carbon black from a hydrocarbon gas, for example natural gas, and to recover a larger proportion of the carbon constituent per unit volume of gas than has hitherto been possible with many known methods and devices.

A further object of my invention is a method and an apparatus for producing carbon black whereby the cost of installation and operation of the plant are reduced to a minimum and the efficiency of production generally improved, the operation according to this method being continuous and non-intermittent.

The method and apparatus generally used for producing carbon black on a commercial scale consists in partially burning the natural gas or other hydrocarbon gas by means of a multiplicity of miniature burners and causing the individual flames or products of combustion to play upon chilled surfaces whereon a portion of the carbon content is deposited and subsequently scraped off. The black thus obtained often contains metallic iron and scale, is accompanied by burned particles of carbon and often contains other impurities and characteristics which render it unsuitable for certain of its uses. Moreover the apparatus usually employed is crude and comparatively expensive to build and the collecting devices wear very rapidly, necessitating periodic replacements. Further the usual commercial plants are cumbersome and occupy large areas.

Certain other methods have been suggested for the manufacture of carbon black, but none of them appear to have reached the practical or commercial stage of development.

According to my improvements I produce a carbon of an improved character which is peculiarly free from the above mentioned injurious constituents and undersirable characteristics, and moreover, I obtain larger quantities of carbon per unit volume of gas and in a more efficient and less expensive manner than is possible with known methods and devices.

Generally stated, my improvements reside in the continuous partial or incomplete combustion of the hydrocarbon gas in a comparatively large furnace by supplying to the furnace and to the gaseous flame predetermined quantities of air which are insufficient for complete combustion, and the passing of the resultant products of combustion in the manner hereinafter set forth, through a suitable collecting system for isolating the liberated carbon therefrom. The subject matter of these improvements has been incorporated in various of my copending applications, Serial No. 435,068, "Method and apparatus for producing carbon," Serial No. 435,069, "Method and apparatus for producing carbon," and Serial No. 435,070 "Method and apparatus for producing carbon," covering the process and apparatus broadly, and Patent No. 1,438,542, "Process and apparatus for producing carbon black," the present invention being an improvement over the subject matter of the above mentioned applications and patent.

I have found that the quality and yield of carbon are substantially improved by a careful and accurate adjustment of the mixture of air (oxygen containing agent) and gas supplied to the furnace, and particularly by the manner in which the mixture is accomplished. For example, the admission of the air into the furnace beneath the burners gives good results, particularly when the air is automatically supplied in regulated quantities and at predetermined pressures (preferably only slightly above atmospheric).

I have also found that the rapid exhaust of the products from the furnace and through the collecting system, and the maintenance of an accurate balance throughout tend toward greater yield and more efficient operation. To this end I regulate the conditions within the furnace and the pressure and velocities throughout the collecting system in the novel manner hereinafter set forth.

I also obtain an improved quality of carbon and increase the efficiency of separation by lowering the dew point of the hot products before they reach the collector. For example, I may introduce dry air into the stream of products of combustion and thereby dilute the mixture containing the water vapor before it is subjected to the carbon isolation operation, a drier carbon product being thereby obtained. The admission of cold air (for example atmospheric) serves the double purpose of lowering the dew point of the gases and cooling them to the desired degree before they reach the collector.

This application is directed more particularly to methods and devices tending toward these ends as applied to the incomplete combustion of the gas and separation of the carbon as aforesaid. I prefer also to employ these methods and devices in connection with certain other of my improvements in the manufacture of carbon as will appear hereinafter.

In the practice of my invention I have devised a furnace with a battery of comparatively large burners or gas intakes with their mouths opening into the furnace at points a short distance from the bottom of the chamber, and with an air intake or intakes disposed below the level of the burners. The hydrocarbon gas issuing from the gas intakes is caused to burn very slowly and lazily by supplying thereto predetermined quantities of air, but insufficient to produce complete combustion, the gas being supplied at a pressure above atmosphere and the burning taking place at the desired pressure. Means are provided for regulating the pressure and the volume of the gas supplied to the burners and for automatically regulating and supplying the exact quantity of air required to the furnace. Preferably this means consists of a rotary fan or blower as it is easily regulated and good results have been obtained therewith. Provision is made for the rapid exhaust of the resulting products and gases through a restricted outlet near the top of the furnace, preferably consisting essentially of an exhauster at the furnace outlet. The hot products with the liberated carbon are forced by this exhauster through a cooling system or circuit of restricted dimensions for reducing the temperature, and thence to a collector where the carbon is separated from the other constituents. The collector is preferably either of the electrical precipitation type or of the closed bag filtration type. A fan or blower together with an exhaust regulator is also disposed at the collector outlet for the purpose of assisting the controlling devices to maintain the natural draft of the products of combustion and to impart thereto the required velocity through the restricted passages of the cooling system. By means of these devices the exact operating conditions throughout the system may be adjusted and controlled with the required facility for efficient operation. The hot gases with the liberated carbon in suspension are drawn through the conduits at sufficient velocity to carry along therewith the greater portion of any flocculent carbon which may be precipitated in the cooling pipes, and substantially the whole of the liberated carbon which leaves the furnace with the gases is borne to the collector and thence recovered.

The advantages of my improved method and apparatus will more fully appear from the following detail description and the accompanying drawings, the latter being diagrammatic illustrations of the system and apparatus according to certain modifications, wherein—

Figure 1 is a diagrammatic drawing of a system embodying my improvements, and

Figure 2 is an illustration of a modified form of collector.

Referring to these drawings I have illustrated in section a furnace 1, this furnace being of large or generous dimensions as compared with certain of the other elements of the apparatus. There are provided a number of burners 2 (only two being illustrated) which are supplied with a hydrocarbon gas, for example natural gas, through a supply pipe 3 leading to a gas main 4. A valve 5 is indicated for controlling the gas circuit and preferably the circuit is provided with a gas pressure regulator (not illustrated) for the purpose of supplying gas at a substantially uniform and constant pressure. The furnace is preferably sealed against the entrance of air or other oxygen containing agent except through an air opening 6 through which the air may be admitted at a point below the level of the burners 2. A rotary fan or blower 7 is provided for positively supplying a predetermined and regulated quantity of air through the opening 6 and down below the burners 2. A regulator 8 is provided for adjusting the size of the opening 6 and thereby enabling cooperation with the blower for effecting accurate control of the quantity of air supplied. This regulator may be of any conventional form, but is illustrated as of the shutter type by which means the air opening may be adjusted to the required area to give the exact quantity of air at atmospheric pressure desired. It is noted that the burners 2 are disposed near the bottom of the furnace and that the air opening 6 is disposed slightly below the level of these burners, this arrangement having been found to give good results. It is understood, however, that this arrangement may be varied in some respects without departing from the spirit of the invention.

Near the top of the furnace 1 there is provided a restricted outlet 9 which leads to a cooling circuit or system 10. From the cooling system 10 the furnace outlet leads to a collector 12. The cooling system consists of a pipe of restricted dimensions as compared to the volume of the furnace and a water spray system 13 which may continuously spray cold water upon the cooling pipes 10 for the purpose of reducing the temperature of the products of combustion passing therethrough. The degree of cooling may be regulated by adjusting the supply of water to the spraying system as for instance by means of a valve 14 in the water main. The cooling pipes 10 are observed to slightly diminish in cross section from the front to the rearmost end. This reduction in cross section may be made because the products of combustion may be reduced in volume as they are cooled by contact with the cooling pipes. The resulting increase in density of the gases passing through the cooling and collector system promotes the efficient separation of the carbon from the other gases.

For insuring the rapid exhaust of the products from the furnace and through the collecting system, there is provided a suction blower 15 between the outlet 9 and the circuit 10. This suction blower may be regulated and adjusted to impart the required velocity to the products and thereby insure the rapid exhaust from the furnace.

The pipe 10 is provided with a section 16 the latter having perforations 17 therein for the admission of atmospheric air. The quantity of air admitted may be controlled by the sleeve 18 surrounding the section 16, the former being longitudinally adjustable along the section.

Two different types of collectors are illustrated, collector 12 being of the bag filtration type and collector 12¹ (Fig. 2) being of the electrical precipitation type. The collector 12 consists generally of a container, preferably of cylindrical shape, with the hopper 19 on the lower part for collecting the carbon as it falls by gravity or is caused to fall from the filtration bags. The filtration bags are indicated diagrammatically at 20 whose open ends register with the openings 21 in the partition plate 22 carried by the container. The bags (only two of which are shown) may be carried in any suitable manner and means may be provided, if desired, for agitating or shaking the bags to loosen the carbon collected thereby. I have illustrated a novel chain arrangement for loosening the carbon. The chain 23 being suspended from the bar 24 and the whole being mounted upon a crank 25 whereby the chains may be given the necessary movement for contacting with and jostling the bags. The chains preferably are suspended to hang downwardly within the bags.

A suction fan or exhauster 26 is provided for assisting the other control devices to maintain the proper balance of the system, the suction fan being connected with the upper part of the collector container through a conduit 27. There is disposed within this conduit a regulating valve 28 whereby the exhaust or draft pressure may be regulated or adjusted to a nicety.

The operation of the system may be described substantially as follows:

The natural gas having been turned on (at a pressure above that of the atmosphere), the burners are lighted and the air regulator 8 and blower 7 adjusted to supply positively the exact quantity of air desired for the most efficient operation of the system and the products of combustion resulting from the incomplete combustion of the natural gas gradually accumulate in the furnace until the upper part thereof is completely filled with the gases and the liberated carbon in suspension. The main gate 30 in the circuit being open the products of combustion with the suspended liberated carbon are exhausted through suction fan 15 and caused to circulate through the cooling system 10. The suction fan 26 together with its regulating valve 28 (and also the suction fan 15) are adjusted to give an exhaust pressure and velocity sufficient to carry the products of combustion together with the suspended carbon through the restricted cooling system and through the filtration bags of the collector. The velocity in the cooling circuit is such that the greater portion of flocculent carbon which is precipitated or becomes deposited upon the inner walls of the cooling circuit is carried along with the main stream of products of combustion into the collector so that the greater portion of the liberated carbon which leaves the furnace through the outlet 9 actually reaches the collector and is there filtered out and deposited into the hopper 19 the cleansed gases pass out through a conduit 27 and the blower 26.

I have found that the bag collectors operate very efficiently to filter out the liberated carbon and that they work particularly well at temperatures below 225° F. Efficient results for example have been obtained with the operation of the collector gases at a temperature of 170° F. to 225° F. I have also found that with the proper adjustment of the gas and air supplied to the furnace and with a proper balance of the system including the careful adjustment of the exhaust pressure and the degree of cooling that the carbon black recovered in the hopper 19 is a particularly desirable commercial product and is free from the above noted injurious constituents and undesirable qualities; moreover the yield of carbon per unit of gas is found to be greater than the yield of carbon produced by many known methods and devices.

These results are noticeable to a certain degree under various conditions of operation, but are particularly marked with temperatures in the furnace running above 1200° F. For example, with temperatures of the furnace of 1400° F. to 1800° F. (as measured by pyrometer 31), and with careful adjustment of the air admitted into the furnace, both the yield and quality of carbon produced are good. It is also observed that with an adjustment such that the products of combustion and intermixed gases are all retained above the level of the burners 2, the yield and quality are good. For example, as indicated in Figure 1, there seems under certain conditions to be a clear and defined dividing line or blanket 32 between the gases 33 above and the air below this line, and the air entering the furnace and collecting beneath this blanket is probably preheated to a certain degree before it enters the combustion and disassociation space. This balance may be established and maintained by preferably adjusting the three blowers which are preferably of different capacities—the blower 7 being the largest and the suction fan 15 being intermediate in capacity.

The products of combustion contain in suspension a certain quantity of water vapor due to the burning of the hydrogen content, but the gases are caused to pass through the collector in such condition that the same is carried on through with the cleansed gases leaving the collected carbon substantially free from moisture, that is, condensation of the water vapor is prevented. This may be controlled to some degree by admitting air through the openings 17 into the pipe 10 where it mingles with the gaseous products and lowers the dew point thereof. If the admitted air is cool it will have a cooling function also.

I have also found that the electrical precipitator cooperated to a particular degree with my other apparatus to produce a large yield of carbon per unit of gas, although I now prefer for certain reasons the bag filtration system.

For the purpose of relieving the furnace 1 of the products of combustion or for other reasons an outlet 34 is provided and is disposed near the top of the furnace, a door 35 being positioned upon the upper end of the pipe 34 for the purpose of opening or closing the same.

In accordance with the requirements of the patent statutes I have set forth only one form of the many forms my invention is capable of assuming. The drawings being purposely diagrammatic for convenience in illustration, and it is understood that the claims annexed hereto are not to be construed as limited to the exact methods and devices illustrated, except as is specifically recited therein, but are to be construed to cover all modifications coming within the spirit of the invention.

I claim:

1. In an apparatus for separating and recovering carbon black from a hydrocarbon gas, the combination of a furnace together with gas burners adapted to receive and partially burn the gas by the supply thereto of air in quantities insufficient for complete combustion, means for supplying to said furnace and burners predetermined quantities of air or other oxygen containing agent, a cooling and collecting system for receiving the resultant products, and exhausting means disposed between the furnace and the cooler for rapidly exhausting the products of combustion from the furnace.

2. In an apparatus for separating and recovering carbon black from a hydrocarbon, the combination of a furnace together with burners adapted to receive and partially burn the hydrocarbon by the supply thereto of air in quantities insufficient for complete combustion, means for supplying the hydrocarbon to said burners, means for positively furnishing to said burners and said furnace predetermined quantities of air, a collecting system wherein the resultant products are passed at a comparatively high velocity, and an exhauster disposed between the furnace and the cooler for the purpose set forth.

3. In an apparatus for separating and recovering carbon black from a hydrocarbon, the combination of a burner for receiving the hydrocarbon and partially burning the same, a device for supplying a predetermined proportion of air to the burners, means for cooling the resultant products and isolating the liberated carbon content, and an exhauster disposed between the furnace and the cooler for rapidly removing the products from the furnace.

4. In an apparatus for separating and recovering carbon from a hydrocarbon gas, the combination of a furnace and burners adapted to receive and partially burn the gas, a rotary blower and regulating means for supplying to the furnace and to the burners predetermined quantities and proportions of air, a collecting system for receiving the resuling products of combustion from the furnace and isolating the liberated carbon therefrom, an exhauster between the furnace and the collector, and a second exhauster disposed at the outlet of the collector for the purpose set forth.

5. In an apparatus for separating and recovering carbon black from a hydrocarbon gas, the combination of a burner adapted to receive and partially burn the gas, a rotary blower and regulating means for supplying to said burner predetermined proportions and quantities of air of less moisture content, a cooling and collecting system for receiving the resulting products of combustion from the furnace and isolating the liberated carbon therefrom, an exhauster between the collector and the furnace for rapidly exhausting the products and a second exhauster disposed at the collector outlet for the purpose set forth.

6. In an apparatus for separating and recovering carbon black from a hydrocarbon gas, the combination of a furnace with burners in the lower portion thereof for receiving and partially burning the gas, a rotary blower for supplying predetermined proportions and quantities of air to said furnace at a point or points below the level of said burners, and means for subjecting the resulting products of combustion to a carbon isolating process, comprising means for rapidly exhausting the products from the furnace, means for cooling the gases, a collector and an exhauster for rapidly exhausting the cleansed products from the collector.

7. In an apparatus for separating and recovering carbon black from a hydrocarbon gas, the combination of a furnace of comparatively large dimensions with burners disposed in the lower part thereof, a rotary blower with regulating means adapted to supply predetermined quantities and proportions of air to said furnace at a point or points below the level of the burners, and a collecting system adapted to receive the products of combustion and isolate the liberated carbon therefrom comprising an exhauster for rapidly exhausting the products from the furnace, a cooler, a collector and a second exhauster for exhausting the cleansed gases from the collector.

8. In an apparatus for separating and recovering carbon black from a hydrocarbon gas, the combination of a furnace of a comparatively large volume with burners disposed in the lower part thereof adapted to receive and partially burn the gas, a rotary blower with regulating means adapted to supply predetermined quantities and proportions of air to the furnace and the burners, a cooling system of restricted dimensions through which the products of combustion are adapted to pass, a collector adapted to receive the cooled products and isolate the liberated carbon, and means for establishing the circulation of the products of combustion from the furnace and through the cooling and collecting system comprising exhauster disposed between the furnace and the cooler and an exhauster disposed at the collector outlet.

9. The method of separating and recovering carbon from a hydrocarbon, which consists in partially burning the hydrocarbon by supplying thereto oxygen in quantities insufficient for complete combustion, lowering the dew point of the resultant products of combustion and finally subjecting the same to a carbon isolating operation.

10. The method of separating and recovering carbon from a hydrocarbon, which consists in partially burning the hydrocarbon by supplying thereto an oxidizing agent in quantities insufficient for complete combustion, lowering the dew point of and cooling the resultant products of combustion, and finally subjecting the resultant products to a carbon isolating operation.

11. The method of separating and recovering carbon from a hydrocarbon, which consists in partially burning the hydrocarbon by supplying thereto air in quantities insufficient for complete combustion, diluting the resultant products of combustion with a comparatively dry gas, and finally subjecting the products to a carbon isolating operation.

12. The method of separating and recovering carbon from a hydrocarbon, which consists in partially burning the hydrocarbon by supplying thereto air in quantities insufficient for complete combustion, diluting the resultant products of combustion by admitting air of less moisture content thereto, and finally subjecting the products to a carbon isolating operation.

13. The method of separating and recovering carbon from a hydrocarbon, which consists in partially burning the hydrocarbon under conditions resulting in the liberation of a portion of the carbon content, diluting the resultant products by supplying dry air thereto, and finally subjecting the resultant products to a carbon isolating operation.

14. The method of separating and recovering carbon from a hydrocarbon, which consists in partially burning the hydrocarbon under conditions resulting in the liberation of a portion of the carbon content, lowering the dew point of the resultant products by diluting the same with a comparatively dry gas, cooling the resultant products, and finally subjecting the same to a carbon isolating operation.

15. The method of separating and recovering carbon from a hydrocarbon, which consists in partially burning the hydrocarbon under conditions resulting in the liberation of a portion of the carbon content, mixing with the resultant products cold air for the purpose set forth, and finally subjecting the same to a carbon isolating operation.

16. The method of separating and recovering carbon from a hydrocarbon, which consists in partially burning the hydrocarbon under conditions resulting in the liberation of a portion of the carbon content, mixing with the resultant products cold air, reducing the temperature of the products, and finally subjecting the same to a carbon isolating operation.

17. The method of separating and recovering carbon from a hydrocarbon, which consists in partially burning the hydrocarbon under conditions resulting in the liberation of a portion of the carbon content, passing the resultant products at a comparatively high velocity and diluting them with a relatively dry gas for the purpose of lowering the dew point thereof, cooling the resultant products, and finally subjecting the same to a carbon isolating operation.

18. The method of separating and recovering carbon from a hydrocarbon, which consists in partially burning the hydrocarbon in a closed chamber by positively supplying thereto air at predetermined pressures and in quantities insufficient for complete combustion, rapidly exhausting the products of combustion from the chamber by means of a suction exhauster disposed at the furnace outlet, passing the resultant products to a collector and rapidly exhausting the products of combustion from the collector by means of an exhauster associated therewith.

19. In an apparatus for separating and recovering carbon from a hydrocarbon, consisting of a closed chamber and a suitable collector, the method of maintaining proper balance of the system, which consists in automatically supplying air in predetermined quantities and at a predetermined pressure to the chamber, positively withdrawing the product from the furnace by means of exhauster disposed at an outlet thereof, and finally positively exhausting the products from the collector through the medium of an exhauster disposed at the collector outlet.

20. In a system for separating and recovering carbon from a hydrocarbon, the combination of a furnace and a collector with a rotary blower for supplying air to the furnace in predetermined quantities, an exhauster for rapidly exhausting the products from the furnace disposed at the furnace outlet, and a second exhauster disposed at the collector outlet.

21. In a system for separating and recovering carbon from a hydrocarbon, the combination of a furnace and a collector with three balancing gas propellors, the first supplying air in regulated quantities to the furnace, the second being disposed between the furnace and the collector and adapted to rapidly withdraw the products from the furnace, and the third being disposed at the collector outlet and adapted to rapidly withdraw the cleansed products from the collector, the second propellor being intermediate in capacity between the other two, and the third propellor being the largest of the three.

22. A method of forming and recovering carbon which comprises partially oxidizing a hydrocarbon with air in quantity insufficient for complete combustion, lowering the proportion of condensible vapors in the gaseous products formed and separating the carbon particles there-from.

23. A method of forming and recovering carbon which comprises partially oxidizing hydro carbons and forming free carbon in the gaseous products of said partial oxidization, reducing the vapor tension of condensible products in said gaseous products of combustion without condensation and recovering the carbon from the resulting gases.

24. The method of separating and recovering carbon from a hydrocarbon, which consists in partially burning the hydrocarbon in a closed chamber by positively supplying thereto air at regulated pressures and quantities insufficient for complete combustion, rapidly exhausting the products of combustion from the chamber by means of an exhauster disposed at the furnace outlet, passing the resultant products to a collector and rapidly exhausting the products of combustion from the collector by means of an exhauster associated therewith.

In testimony whereof, I affix my signature.

CHAUNCEY MATLOCK.